United States Patent [19]

Rubin

[11] 4,443,799

[45] Apr. 17, 1984

[54] SPREAD SPECTRUM RADAR

[75] Inventor: William L. Rubin, Whitestone, N.Y.

[73] Assignee: Sperry Corporation, New York, N.Y.

[21] Appl. No.: 279,922

[22] Filed: Jul. 2, 1981

[51] Int. Cl.³ ............................................. G01S 7/28
[52] U.S. Cl. ................................. 343/17.2 PC; 375/1
[58] Field of Search .................. 343/17.2 R, 17.2 PC,
343/14; 375/1

[56] References Cited

U.S. PATENT DOCUMENTS 3,686,572  8/1972  Guilhem et al. ............ 343/17.2 PC
3,725,926  4/1973  Ares ............................... 343/17.2 R
4,053,889  10/1977 Johnson ....................... 343/17.2 PC Primary Examiner—Maynard R. Wilbur
Assistant Examiner—M. R. Gordon Attorney, Agent, or Firm—Howard P. Terry; Seymour Levine

[57] ABSTRACT

A spread spectrum radar apparatus wherein a plurality of carrier signals frequency modulated over predetermined time intervals and separated in frequency such that the spectra of the signals do not overlap are sequentially transmitted. Radar returns of this transmission sequence are coupled to a receiver which is frequency band activated in accordance with the transmission sequence and in a manner to minimize radar minimum detection range. Each radar echo is processed through a matched filter for pulse compression, delayed in accordance with the position of its transmitted signal, detected, and non-coherently summed with detections of returns from the same target of other interval transmissions.

10 Claims, 9 Drawing Figures

SPREAD SPECTRUM RADAR

BACKGROUND OF THE INVENTION

1. Field of the Invention

The invention relates to radar systems and more particularly to a radar system utilizing a spread spectrum and a combination of coherent and non-coherent signal processing techniques.

2. Description of the Prior Art

A conventional radar operates by transmitting a pulse modulated sine wave signal, detects returned pulses from reflecting objects in the transmission path, and determines the time interval between the transmission and reception of these signals. Maximum range for these radars is a function of the total energy transmitted with each pulse while range resolution capability is a function of the pulse width, increasing with decreasing pulse widths. Since the energy within each pulse is equal to the product of the peak power times the duration of the pulse, it is evident that a trade-off between maximum range and target resolution exists for radar systems that are peak power limited. The long pulse necessary to achieve long range capability for these radar systems need not, however, be incompatible with good range resolution.

It is well known that radar range resolution is a function of the radar signal bandwidth, the resolving capability improving with increasing radar signal bandwidth. In a pulsed monochromatic system this bandwidth is substantially equal to the inverse of the pulse width, thus decreasing with increasing pulse width. Compensation for this reduction in bandwidth with increased pulse width may be realized by providing a frequency modulated carrier within the pulse. By appropriately processing the pulsed frequency modulated signal returned from a target the pulse may be compressed to form a pulse of a width corresponding to the transmitted bandwidth, thus providing a resolution capability which exceeds that achievable with a pulsed single frequency signal having the same pulse width. Maximum range for these pulse compression systems, as in the conventional single frequency pulse modulated systems, is a function of the total energy transmitted within each pulse and, for a peak power limited system is increased with increased pulse width. Since the receiver is generally disabled during transmission, this lengthening of the transmitted pulse adversely affects the minimum range of the system and may necessitate the utilization of a conventional pulsed radar system for coverage to the minimum range of the pulse compression system. Additionally, extremely high resolution and very long range operational characteristics necessitate very large time bandwidth products which require complex circuitry, are difficult to achieve, and are expensive to implement.

SUMMARY OF THE INVENTION

The present invention utilizes a combination of coherent and non-coherent signal processing techniques to achieve a spread spectrum radar system. In one preferred embodiment of the invention a transmitter is programmed to sequentiallly radiate a plurality of frequency modulated signals each having equal bandwidth but different carrier frequencies selected such that the spectra of adjacent signals in the sequence are substantially non-overlapping. Each of these frequency modulated signals extend over a time interval, of selected duration, in a sequence of contiguous time intervals, with the interval of shortest duration occurring as the last in sequence. At the beginning of this lateral interval, the system range gate is initiated and at its conclusion the receiver is activated. Thus, the minimum detection range is determined by the duration of the last time interval.

Echo returns from a target of this sequence of frequency modulated signals are coupled to a bank of mixers in the receiver, each having a frequency band corresponding to a different one of the transmitted signals. These mixers provide a plurality of output signals which are frequency modulated within pulses of time duration that are substantially equal to the time durations of the plurality of contiguous time intervals. Each output signal is coupled to a corresponding matched filter-delay line combination to provide pulses of substantially equal width and in substantially time coincidence. These pulses are individually detected in a plurality of envelope detectors to derive video signals that are coupled to a summing network from which a non-coherent sum of the video signals is coupled to the radar processor.

Since the range gate is initiated at the commencement of the last signal interval in the sequence and the receiver is opened at its conclusion, the signal returns from all the preceding intervals for ranges corresponding to the time duration of the final interval would have arrived prior to the receiver activation, thus at short ranges only returns of the final interval signal are receivable. As the elapsed time from the activation of the receiver increases, signal returns from targets at longer ranges resulting from transmissions during prior intervals become available until the elapsed time from the activation of the receiver equals the total transmission time interval, i.e., the sum of the plurality of time durations of the intervals in the sequence, after which signal returns from targets at ranges greater than that corresponding to this total transmission interval are available for all transmission intervals. Signal returns from these long range targets are summed as described above to derive the signal coupled to the radar processor.

In a second embodiment of the invention, the first transmission interval is of the shortest duration in the sequence. A multiplicity of mixers, each tuned to receive signal returns resulting from signals transmitted within a selected one of the sequence of time intervals, are coupled through a switch bank to the input terminals of the receiver. At the conclusion of the first transmission interval, a mixer tuned to receive echoes of the signal transmitted therein is switchably coupled to the receiver input terminal, thereby permitting return signals to couple thereto. When the second transmission interval is complete, a second mixer is switchably coupled to the receiver input terminal. With the completion of each succeeding transmission interval, another mixer is coupled to the input terminal of the receiver until all the transmission intervals are completed. Each of the output signals from the mixers are coupled to matched filter-delay line combinations and processed as previously described.

DESCRIPTION OF THE PREFERRED EMBODIMENTS

Figure 1A:
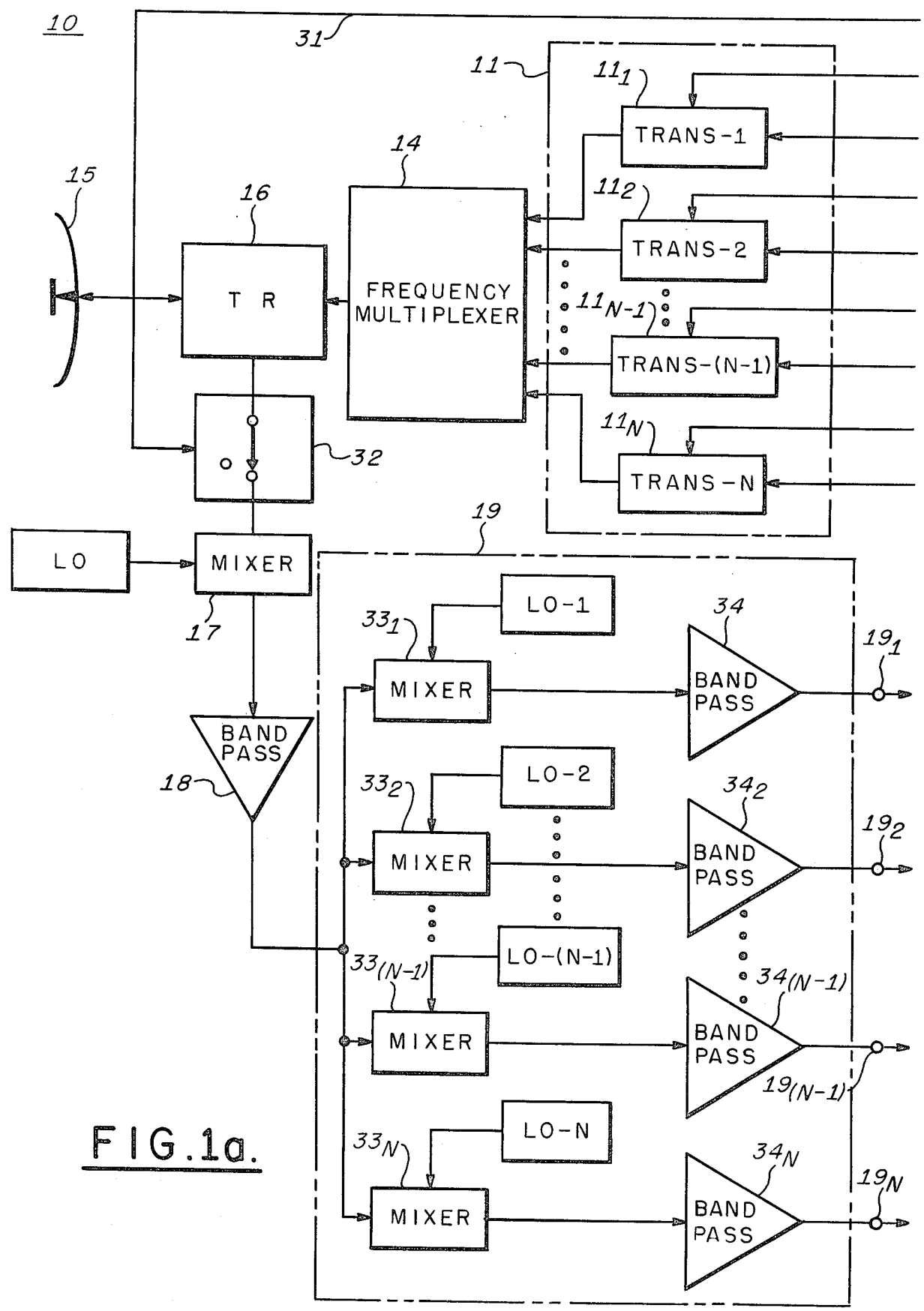
FIG. 1a is a block diagram of the transmission and mixer stages of a first preferred embodiment of the invention.
Figure 1B:
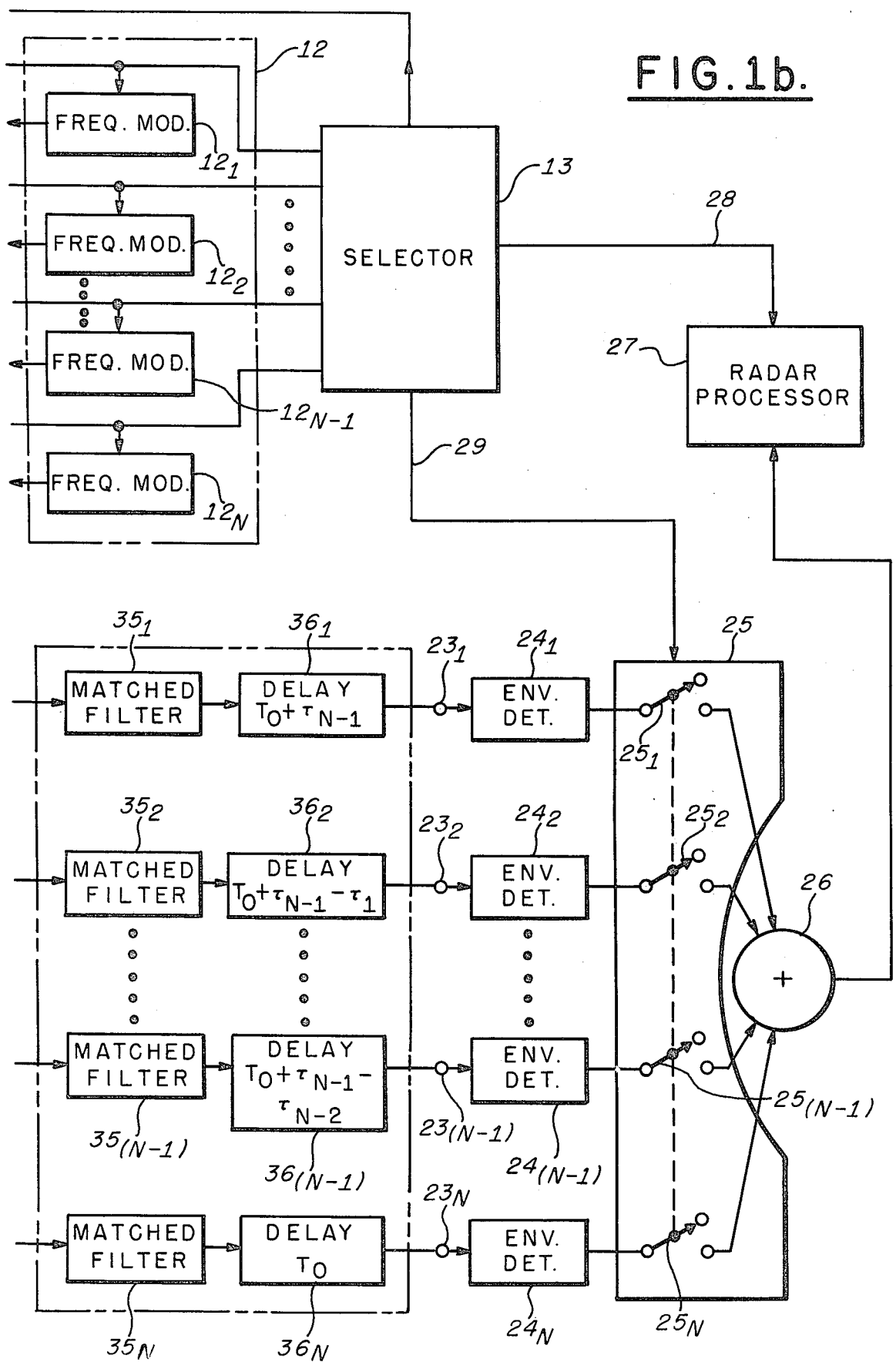
FIG. 1b is a block diagram of the transmission modulation and receiver matched filter stages of a first preferred embodiment of the invention.
Figure 1C:
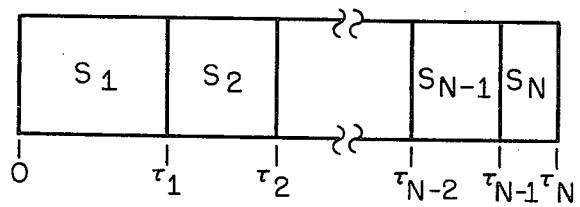
FIG. 1c is a signal transmission diagram showing a sequence of signal transmission intervals with the shortest interval at the end of the sequence.

Referring now to the block diagram of FIG. 1, a spread spectrum radar system 10 may include a multiplicity of frequency modulators $12_1$ through $12_N$ respectively coupled to a multiplicity of transmitters $11_1$ through $11_N$. A selector 13 is coupled to transmitters 11 and frequency modulators 12, while an antenna 15 is coupled to transmitters 11 via a frequency multiplexer 14 and a transmit-receive circuit 16. Antenna 15 also may be coupled via transmit-receive circuit 16 to a mixer 17 which may be coupled through a bandpass amplifier 18 to a demultiplexer 19. Output terminals $19_1$ through $19_N$ of the demultiplexer 19 are coupled to corresponding input terminals of a matched filter-delay line unit 23 having output terminals $23_1$ through $23_N$ coupled respectively to envelope detectors $24_1$ through $24_N$. Matched filter-delay line unit 23 may be of the surface acoustic wave type described by Van deVaart and Solie in Applied Physics Letters, Volume 31, No. 1, July 1, 1977. Output terminals of each of the envelope detectors $24_1$ through $24_N$ are coupled via single pole double throw switches $25_1$ through $25_N$, which are controllable by selector 13, to a summing network 26, the output terminal of which is coupled to a radar processor 27.

Figure 2:
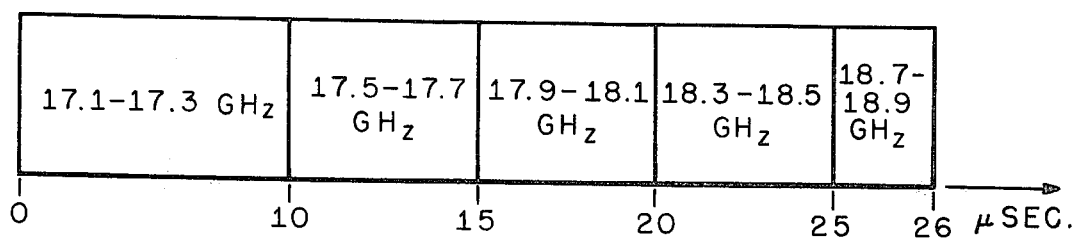
FIG. 2 is an illustration of a signal transmission sequence that may be employed with the embodiment shown in FIG. 1.
Figure 3C:
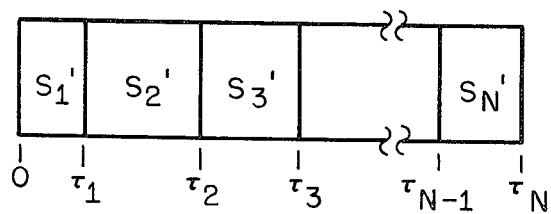
FIG. 3c is a signal sequence diagram with the shortest transmission interval at the beginning of the sequence.
Figure 3A:
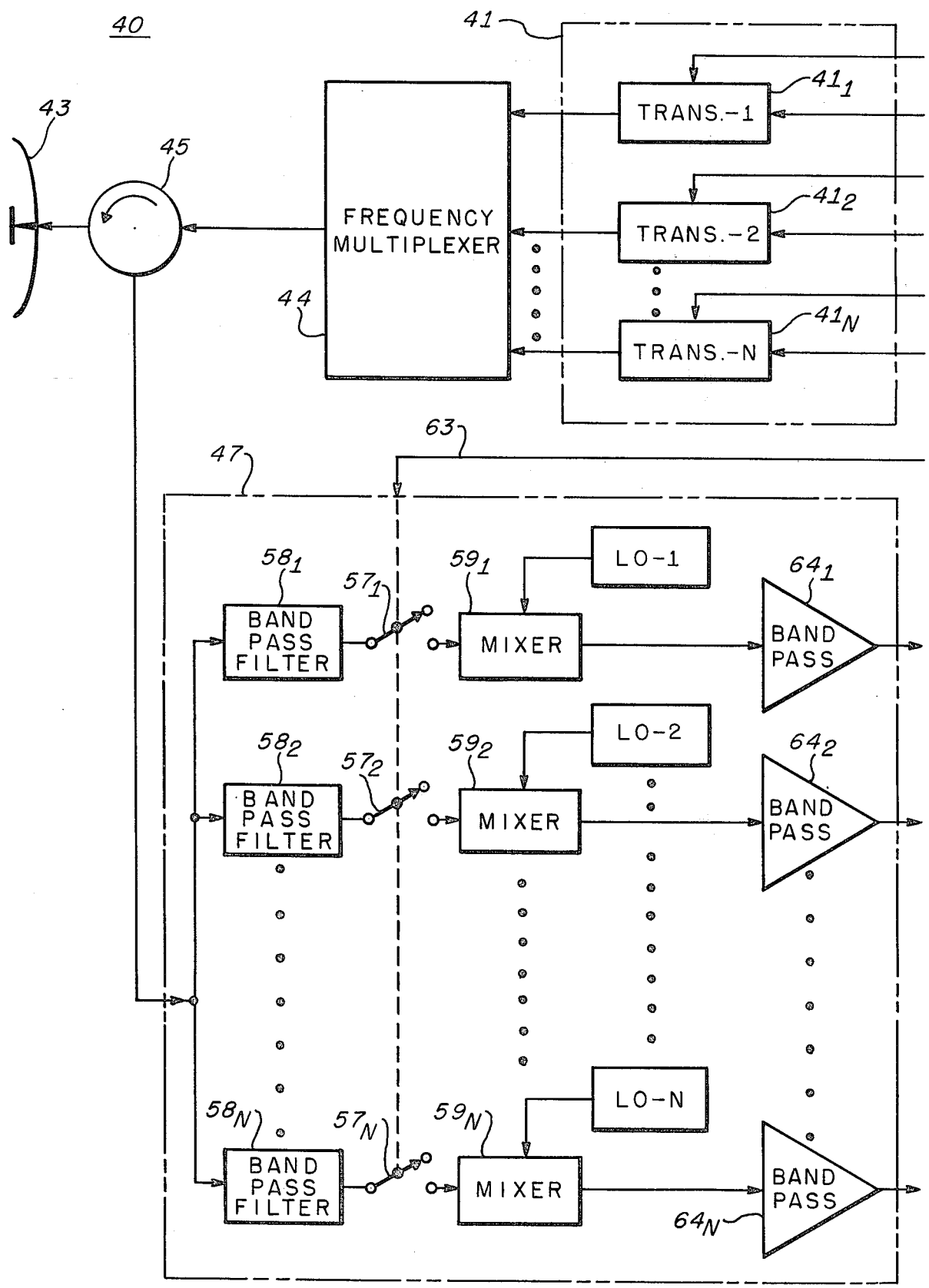
FIG. 3a is a block diagram of the transmission and mixer stages of a second preferred embodiment of the invention.
Figure 3B:
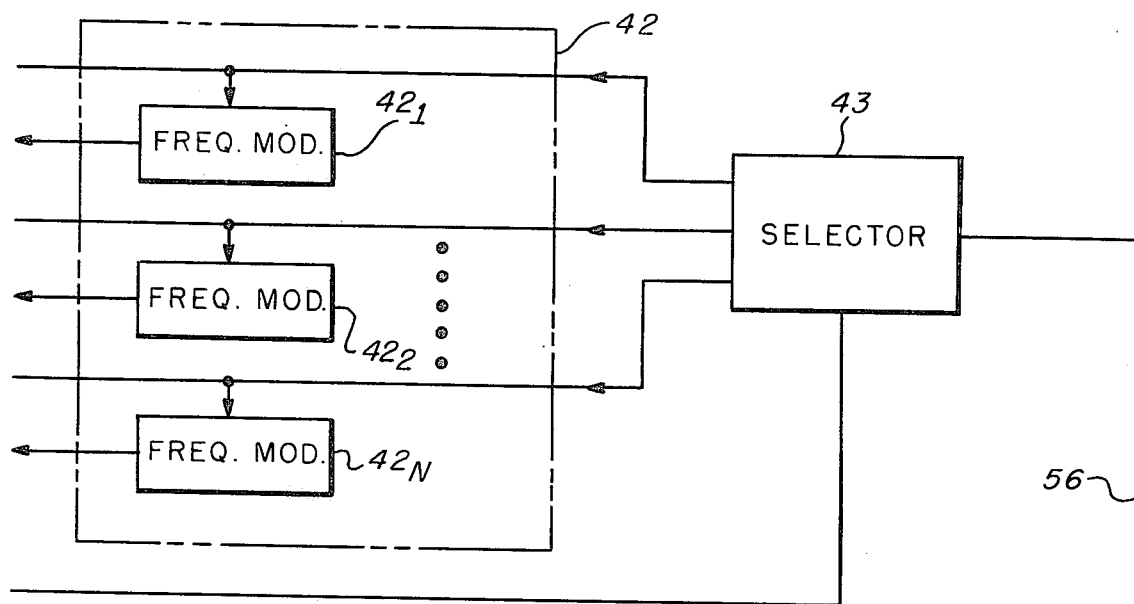
FIG. 3b is a block diagram of the transmission modulation and receiver matched filter stages of a second preferred embodiment of the invention.
Figure 3B:
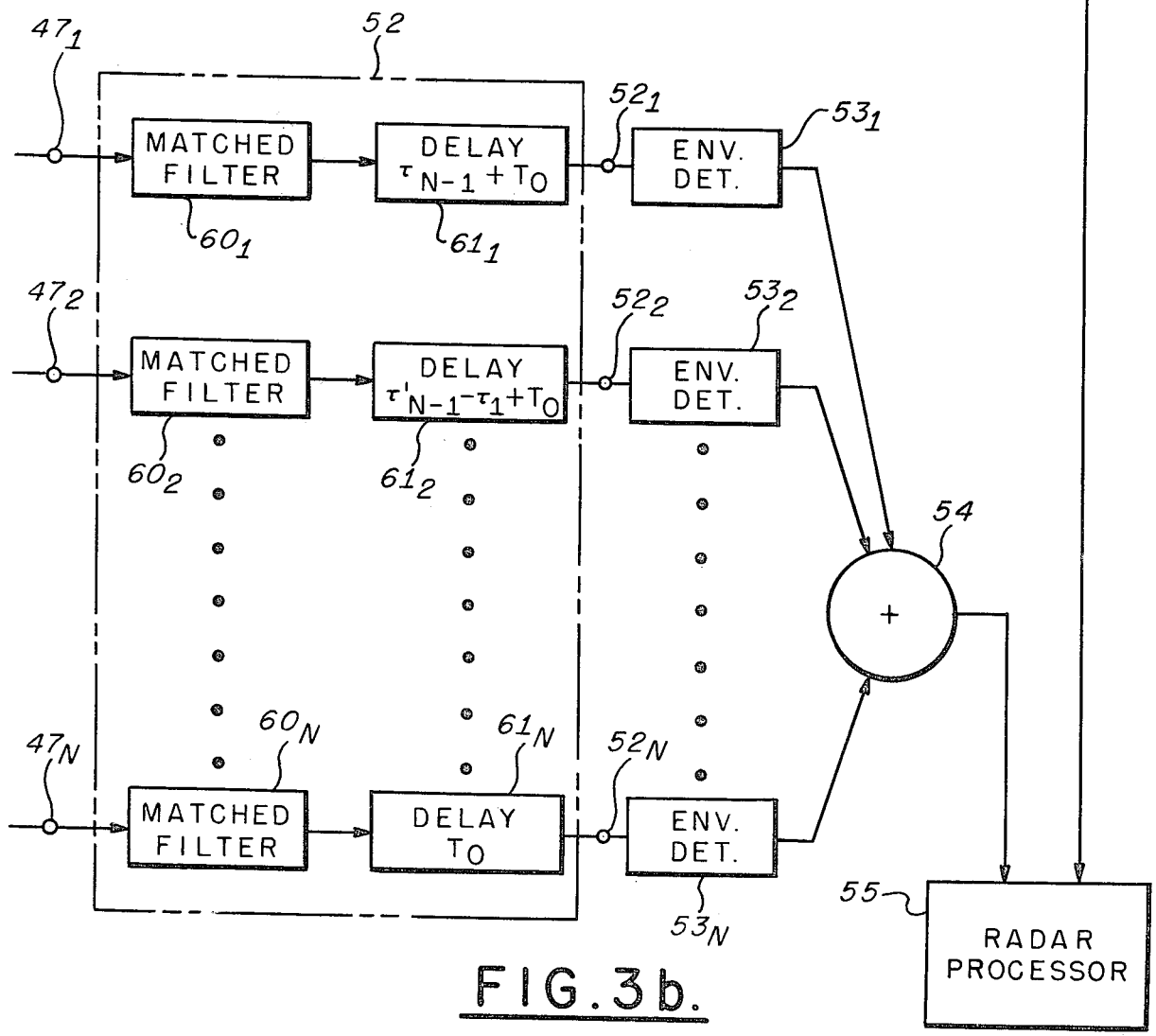

In operation, selector 13 sequentially activates transmitter-frequency modulator combinations $11_1$, $12_1$ through $11_N$, $12_N$ to couple a sequence of signals to the frequency multiplexer 14. This sequence, comprising carrier frequencies $f_1$ through $f_N$ frequency modulated with substantially equal bandwidths over time intervals of generally unequal duration, the last interval in the sequence being of the shortest duration, is coupled from the frequency multiplexer 14 to the antenna 15 via TR circuit 16 for transmission as the radar signal. FIG. 1A depicts a generalized sequence of transmitted signals. A frequency modulated signal $S_1$ with carrier frequency $f_1$ and bandwidth $\Delta f$ is transmitted during the interval between 0 and $\tau_1$, a frequency modulated signal $S_2$ with carrier frequency $f_2$ and bandwidth $\Delta f$ is transmitted during the interval between $\tau_1$ and $\tau_2$, with other frequency modulated signals of substantially equal bandwidth existing in subsequent intervals of the sequence, the last signal $S_N$ in the sequence being transmitted during the interval $\tau_{N-1}$ and $\tau_N$, which is the shortest in the series. The carrier frequencies $f_1$ through $f_N$ of signals $S_1$ through $S_N$ and the bandwidth $\Delta f$ are chosen to preclude spectra overlapping. FIG. 2 is an example of a transmission sequence containing five transmission intervals, the first interval having a duration of ten microseconds, the second, third, and fourth each having a duration of five microseconds, and the fifth having a duration of one microsecond. Within each interval a linear fm signal with a 200 megahertz bandwidth is generated about a center frequency that is 400 megahertz from the center frequency of the fm signal in an adjacent interval, thus providing frequency separations between interval spectra of substantially 200 megahertz. At the time $\tau_{N-1}$ selector 13 couples a pulse via line 28 to trigger the range gate in the radar processor 27 and at $\tau_N$ couples a pulse via line 31 to activate the switch 32 thereby enabling mixer 17 to receive reflections of the transmitted signal sequence. Selector 13 also couples a signal via line 29 to the switching unit 25 to activate the switch $25_N$ thereby coupling the envelope detector $24_N$ to the summing network 26. This condition prevails for a time period substantially equal to the time duration $\Delta\tau_N = \tau_N - \tau_{N-1}$ of the $N^{th}$ transmission interval in the sequence. During this period, video signals derived from transmitter $11_N$ radar returns from targets within the range limits $(C\Delta\tau_N)/2 \leq R_1 \leq C \Delta\tau_N$, C being the velocity of light, are coupled to sum network 26 and therefrom to radar processor 27.

At the completion of the time period, $\Delta\tau_N$ switch 25 $(N-1)$ is activated by a signal from the selector 13 thereby coupling the envelope detector $24_{(N-1)}$ to the summing network 26 expanding the system's range beyond $c\Delta\tau_N$. At this time the video signals from the envelope detectors $24_N$ and $24_{(N-1)}$ are coupled to the summing network 26 and summed therein. This condition prevails for an elapsed time substantially equal to the $(N-1)^{th}$ transmission interval $\Delta\tau_{N-1} = \tau_{N-1} - \tau_{N-2}$ during which video signals derived from transmitter $11_{N-1}$ radar returns and video signals derived from transmitter $11_N$ radar returns from targets within the range limits $c\Delta\tau_N$ and $(c\Delta\tau_{N-1})/2$ are coupled to and summed in summing network 26, wherefrom the signal resulting from the sum of these two video signals are coupled to the radar processor 27. Switches 25 are sequentially activated after elapsed times that are substantially equal to the next preceding interval in the sequence until all the switches $25_1$ through $25_N$ in the switching network 25 have been activated and video signals derived from all transmitter returns are coupled to the summing network 26 from which a signal that is representative of the total of these video signals returned from a distant target is coupled to the radar processor 27. This sequential switch activation causes the number of video pulses non-coherently summed in the summing network 26 to increase from one during the first elapsed time interval to N video pulses after the final switch $25_1$ is activated, which condition exists through the maximum range of the radar system.

Still referring to FIG. 1, radar returns are received by the antenna 15 and coupled via TR 16 to mixer 17 from which a down converted signal is coupled to a bandpass amplifier 18. Down converted signals from bandpass amplifier 18 are coupled to mixers $33_1$ through $33_N$ from each of which a frequency modulated signal emerges that is representative of one of the radar returns of the transmitted signals $S_1$ through $S_N$. These pulsed frequency modulated signals are coupled to bandpass amplifiers $34_1$ through $34_N$ to the one combination of matched filter and delay line of the matched filter-delay line combinations $35_1, 36_1$ through $35_N, 36_N$ corresponding thereto in the matched filter-delay line circuit 23. After pulse compression and delay, available signal returns from a common target are in time coincidence at the output terminals $23_1$ through $23_N$ and coupled therefrom to envelope detectors $24_1$ through $24_N$, wherefrom time coincident video signals, each derived from a return of one of the transmitted waveforms, are coupled to the summing network 26 and non-coherently integrated therein.

Figure 4:
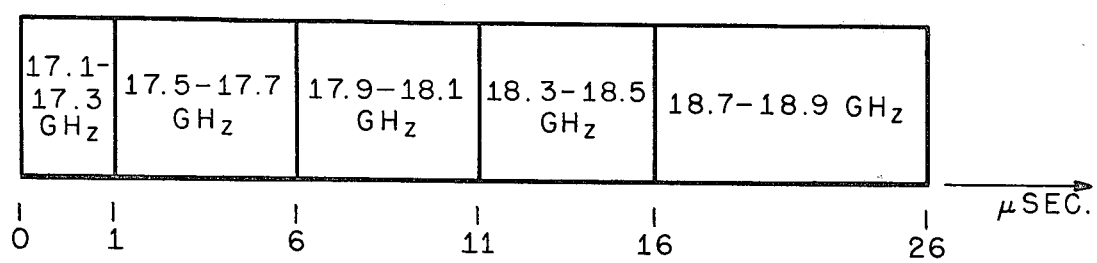
FIG. 4 is an illustration of a signal transmission sequence that may be used with the embodiment shown in FIGS. 3a and 3b.

FIG. 3 illustrates an embodiment of the invention wherein the initial interval in the sequence of transmitted signals is of the shortest duration. A spread spectrum radar system 40 having a first transmission interval shorter than subsequent transmission intervals, in a sequence of transmission intervals, may include a multiplicity of transmitters $41_1$ through $41_N$ with carrier frequencies $f_1'$ through $f_N'$ frequency modulated by frequency modulators $42_1$ through $42_N$. Transmitters 41 and frequency modulators 42 are sequentially activated by a selector 43 while the output terminals of the transmitter 41 are coupled to antenna 43 via a frequency multiplexer 44 and a circulator 5. Antenna 43 is also coupled via circulator 45 to a demultiplexer 47. Demultiplexer 47 possesses a multiplicity of output terminals $47_1$ through $47_N$ respectively corresponding to target signal returns of signals generated by transmitters $41_1$ through $41_N$, each of which is coupled to the one matched filter-delay line combination of the matched filter-delay line combinations $60_1, 61_1$ through $60_N, 61_N$ in a matched filter-delay line circuit 52. Matched filter-delay line unit 23 may be of the surface acoustic wave type described by Van deVaart and Solie in Applied Physics Letters, Volume 31, No. 1, July 1, 1977. The output terminal $52_1$ through $52_N$ of each matched filter-delay line combination $60_1, 60_1$ through $60_N, 61_N$ is coupled via a corresponding envelope detector $53_1$ through $53_N$ to a summing network 54, the output terminal of which is coupled to a radar processor 55. Selector 43 sequentially activates transmitter frequency modulator combinations $41_1, 41_2$ through $41_N, 42_N$ to couple a sequence of signals with carrier frequencies $f_1'$ through $f_N'$. Each carrier is frequency modulated with substantially equal bandwidths over time intervals of generally unequal duration, the first interval in the sequence being of the shortest duration. FIG. 3A depicts a generalized sequence of transmitted signals. A frequency modulated signal $S_1'$ with carrier frequency $f_1'$ and bandwidth $\Delta f'$ is transmitted during the interval between zero and $\tau_1'$, a frequency modulated signal with carrier $f_2'$ and bandwidth $\Delta f'$ is transmitted during the interval between $\tau_2'$ and $\tau_1'$ with other frequency modulated signals of substantially equal bandwidth existing in subsequent intervals of this sequence. The carrier frequencies $f_1'$ through $f_N'$ and the bandwidths $\Delta f'$ are chosen such that the spectra within adjacent transmission intervals do not overlap. FIG. 4 is an example of a transmission sequence containing five transmission intervals, the first interval having a duration of one microsecond, the second, third and fourth each having durations of five microseconds and the fifth having a duration of ten microseconds. Within each interval a linear fm signal with a 200 megahertz bandwidth is generated about a center frequency that is 400 megahertz from the center frequency of the fm signal in adjacent intervals, thus providing frequency separations of the transmitted signals of substantially 200 megahertz. The sequence of pulsed fm signals generated by the transmitters $41_1$ through $41_N$ is coupled to the frequency multiplexer 44 from which it is coupled to the antenna 43 via the circulator 45 and radiated therefrom. Target returns for each signal within the sequence are received by the antenna 43 and coupled to demultiplexer 47 via the circulator 45, wherein they are down converted to establish a sequence of signals corresponding to the transmitted sequence having corresponding time intervals, substantially equal bandwidths within each interval, and down converted carrier frequencies.

Figure 5:
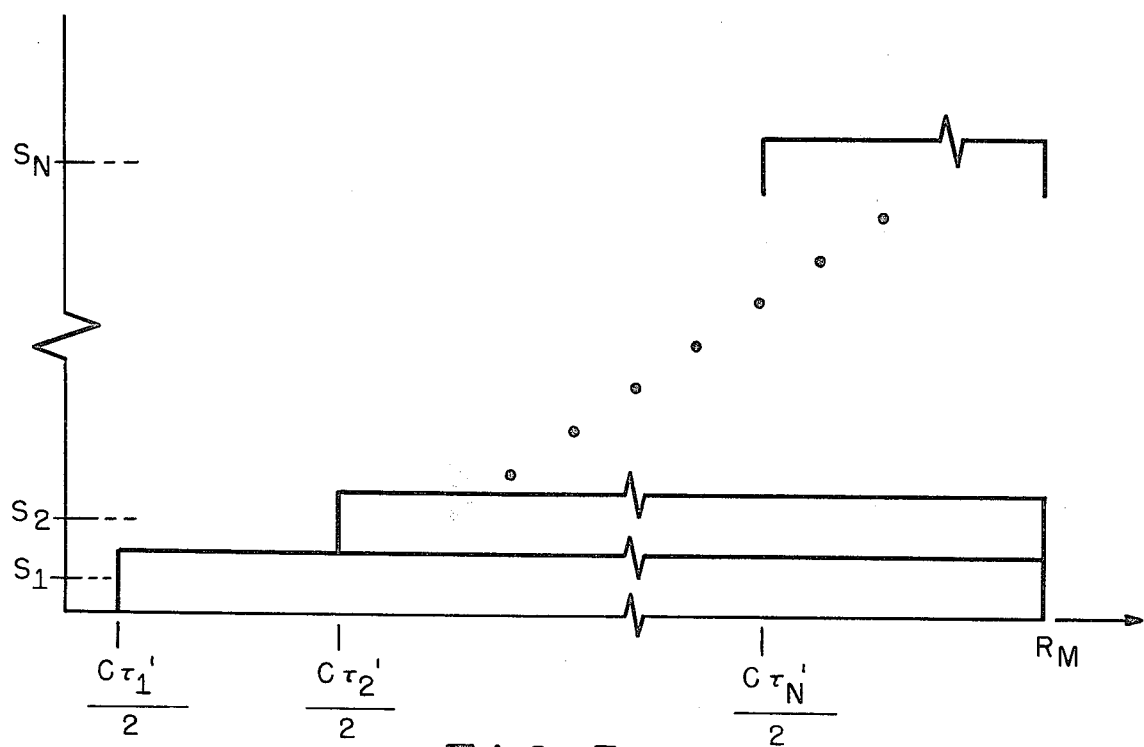
FIG. 5 is a representative of the minimum ranges associated with each transmitted signal of the invention.

At time zero selector 43 couples a signal to radar processor 55 via line 56 to activate a range gate therein and at time $\tau_1'$ couples a pulse to the demultiplexer which activates switch $57_1$ that couples a bandpass filter $58_1$ to a mixer $59_1$. Bandpass filter $58_1$ and mixer $59_1$ are tuned to down convert signals within the first transmission interval to a frequency modulated signal with bandwidth $\Delta f$ and center frequency $f_0$. This down converted signal may be coupled through bandpass amplifier $64_1$ to the demultiplexer output terminal $47_1$, wherefrom it is coupled to matched filter $60_1$ in the matched filter-delay line circuit 52, compressed therein and delayed in delay line $61_1$ for a time $\tau_{N-1}'$. After this delay, the signal is coupled via output terminal $52_1$ to the envelope detector $53_1$, wherefrom a video pulse representative of an echo return of the signal transmitted during the interval of zero and $\tau_1'$ from targets at ranges greater than $(c\tau_1')/2$ is coupled to the summing network 54. At $\tau_2'$, the conclusion of the second transmission interval, selector 43 couples a signal to the demultiplexer 41 that activates a switch $57_2$ to couple a second bandpass filter $58_2$ to a second mixer $59_2$. Bandpass filter $58_2$ and mixer $59_2$ are tuned to down convert signals in the second transmission interval to a frequency modulated signal of bandwidth $\Delta f'$ and center frequency $f_0$. This frequency modulated signal may be coupled to a bandpass amplifier $64_2$ wherefrom a signal representative thereof may be coupled to the output terminal $47_2$ of the demultiplexer 47. The pulsed fm signal at terminal $47_2$ is coupled to matched filter $60_2$ of the matched filter-delay line circuit 52 wherein it is compressed and thereafter delayed in delay line $61_2$ for a time $(\tau_{N-1}'-\tau_1')$ to couple a pulse to the output terminal $52_2$ that is representative of the returns of the signal transmitted within the interval $\tau_2'$ and $\tau_1'$ from targets at ranges greater than $(c\tau_2')/2$. Since switch $57_1$ remains closed during the transmission interval $\tau_2'$ and $\tau_1'$, compressed signals representative of target returns from targets at ranges greater than $(c\tau_2')/2$, of the signal transmitted between the interval $\tau_1'$ and zero are present at output terminal $52_1$ substantially in time coincidence with the signal returns at terminal $52_2$. The effective ranges for each of the transmitted signals $S_1$ through $S_N$ and the ranges after which time coincidence of the echo signals occur are shown in FIG. 5.

The compressed signals at terminals $52_1$ and $52_2$ are respectively coupled to envelope detectors $53_1$ and $53_2$ wherefrom video signals are coupled to summing network 54 integrated therein and a signal representative of the integration thereof is coupled to radar processor 55. The process of activating a switch to couple a filter to pass a band of frequencies transmitted during a transmission interval to a mixer tuned to the same frequency band, compressing the received signal, appropriately delaying the compressed signal, envelope detecting the delayed signal, and integrating the detected signal with detected target returns of signals transmitted during previous transmission intervals, continues until the bandpass filter $58_N$ is coupled to the mixer $59_N$ permitting the reception of signal returns of the signals transmitted in the final transmission interval of the sequence. After all the switches have been activated, the receiver remains open for a time necessary to receive returned signals from targets at the maximum range of the system. At the conclusion of the time for receiving returned signals from targets at the maximum range $R_M$ of the system, the selector 43 couples a pulse to the demultiplexer 47 to deactivate the switches $57_1$ through $57_N$ decoupling the bandpass filters $58_1$ through $58_N$ from the mixers $59_1$ through $59_N$. The receiver remains disabled until the next transmission sequence is initiated after which the switch activation process and signal reception operation is repeated.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A spread spectrum radar apparatus comprising:

means for sequentially transmitting a plurality of carrier signals at preselected center frequencies each having a sequential position and each frequency modulated over a time interval chosen for each carrier signal to establish substantially equal bandwidths within each of said time intervals, such that sequence of frequency modulated transmissions with predetermined time bandwidth products is established said carrier signal frequencies and said bandwidth selected such that spectra of adjacent signals in said sequence of signals are substantially non-overlapping;

demultiplexing means having input means coupled to receive echo returns of said sequence of frequency modulated signals and having a plurality of output ports in correspondence with said plurality of carrier signals for providing signals representative of echo returns of each of said frequency modulated signals at said output ports corresponding to said carrier signals;

means having a plurality of input ports coupled correspondingly to said plurality of output ports of said demultiplexer means for pulse compressing each echo return in accordance with said frequency modulation and for providing time delays between said input ports and output ports corresponding therewith for each echo return in accordance with said sequential position of its carrier signal thereby providing signals at said output ports of said pulse compression means substantially in time coincidence;

detector means having a plurality of input ports coupled correspndingly to said plurality of output ports of said pulse compression-time delay means for providing signals representative of detections of signals coupled from said pulse-compression time delay means; and sum means coupled to receive said signals representative of said detections for providing a signal representative of a sum of all time coincident signals received from said detector means.

2. A spread spectrum radar apparatus in accordance with claim 1 wherein said time intervals are substantially contiguous.

3. A spread spectrum radar apparatus in accordance with claim 2 wherein said transmission sequence comprises time intervals, arranged with an interval of shortest duration ultimate in said transmission sequence.

4. A spread spectrum radar apparatus in accordance with claims 1, 2, or 3 further including means coupled between said output ports of said detector means and said input ports of said sum means for sequentially coupling each of said output ports of said detector means to said corresponding input ports of said sum means, said coupling sequence commencing at conclusions of said transmission sequence with subsequent couplings in said coupling sequence occurring in inverse order of time interval expirations of said transmission sequence.

5. A spread spectrum radar apparatus in accordance with claim 2 wherein said transmission sequence comprises time intervals, arranged with an interval of shortest duration first in said sequence.

6. A spread spectrum radar apparatus in accordance with claim 5 wherein said demultiplexing means includes means coupled between said input means and said plurality of output ports of said demultiplexing means for activating said output ports of said demultiplexing means in a sequence corresponding to said sequential position of said carrier signal corresponding to said output port of said demultiplexing means.

7. A spread spectrum radar apparatus in accordance with claim 3 wherein at least some of said time intervals are equal.

8. A spread spectrum radar apparatus in accordance with claim 7 further including means coupled between said output port of said detector means and said input ports of said sum means for sequentially coupling each of said output ports of said detector means to said corresponding input ports of said sum means, said coupling sequence commencing at conclusions of said transmission sequence with subsequent couplings in each coupling sequence occurring in inverse order of time interval expirations of said transmission sequence.

9. A spread spectrum radar apparatus in accordance with claim 5 wherein at least some of said time intervals are equal.

10. A spread spectrum radar apparatus in accordance with claim 9 further including means coupled between said output ports of said detector means and said input ports of said sum means for sequentially coupling each of said output ports of said detector means to said corresponding input ports of said sum means, said coupling sequence commencing at conclusions of said transmission sequence with subsequent couplings of said coupling sequence occurring in reverse order of time interval expirations of said transmission sequence.

* * * * *